(12) United States Patent
Nelson

(10) Patent No.: US 6,692,147 B2
(45) Date of Patent: Feb. 17, 2004

(54) VENTING RECLOSABLE BAGS

(76) Inventor: Charles Nelson, 11284 Lakeland Cir., Ft. Myers, FL (US) 33913

( * ) Notice: Subject to any disclaimer, the term of this patent is extended or adjusted under 35 U.S.C. 154(b) by 0 days.

(21) Appl. No.: 10/229,325

(22) Filed: Aug. 26, 2002

(65) Prior Publication Data

US 2003/0066267 A1 Apr. 10, 2003

Related U.S. Application Data (60) Provisional application No. 60/314,977, filed on Aug. 24, 2001.

(51) Int. Cl.[7] ............................................. B65D 33/16
(52) U.S. Cl. .......................... 383/63; 383/45; 383/100; 383/102; 24/400
(58) Field of Search .............................. 383/63, 64, 65, 383/45, 100, 102, 103; 24/585.12, 399, 400, DIG. 50

(56) References Cited

U.S. PATENT DOCUMENTS

| | | |
|---|---|---|
| 2,724,543 A | 11/1955 | Bauer |
| 3,122,807 A | 3/1964 | Ausnit |
| 3,173,184 A | 3/1965 | Ausnit |
| 3,878,977 A | 4/1975 | Carlisle |
| 4,212,337 A | 7/1980 | Kamp |
| 4,637,063 A | 1/1987 | Sullivan et al. |
| 5,142,970 A | 9/1992 | ErkenBrack |
| 5,192,135 A | 3/1993 | Woods et al. |
| 5,403,094 A * | 4/1995 | Tomic .......................... 383/63 |
| 5,701,996 A | 12/1997 | Goto et al. |
| 5,829,884 A | 11/1998 | Yeager |
| 5,911,508 A | 6/1999 | Dobreski et al. |
| 6,010,244 A | 1/2000 | Dobreski et al. |
| 6,299,353 B1 * | 10/2001 | Piechocki et al. ............ 383/63 |

* cited by examiner

Primary Examiner—Jes F. Pascua
(74) Attorney, Agent, or Firm—Fish & Richardson P.C.

(57) ABSTRACT

A reclosable bag has a bag body and a reclosable, zipper-type closure. The reclosable closure has extruded male and female interlocking profiles extending along opposing sides of an opening of the bag and are constructed to releasably interlock. The closure also has an extruded valve flange extending from one side of the closure to engage an opposing surface of the closure when the profiles are interlocked. The flange and opposing surface are constructed to separate in response to pressure within the bag for venting the bag with the profiles interlocked, and to increase a contact pressure therebetween in response to presence of a vacuum in the bag. The closure also defines a vent passage extending from an air space between the opposing sides of the opening and between the interlocking profiles and the valve flange. In use, the interlocking profiles are engaged to close the bag opening, and then the bag sides are compressed together to force entrapped air out through the vent opening, deflecting the valve flange away from its opposing surface.

34 Claims, 7 Drawing Sheets

VENTING RECLOSABLE BAGS

REFERENCE TO RELATED APPLICATIONS

This application claims the benefit of provisional patent application No. 60/314,977, filed Aug. 24, 2001, the contents of which are incorporated herein by reference as if fully set forth.

Under 35 USC §119(e)(1), this application claims the benefit of prior U.S. provisional application No. 60/134,111, filed Jan. 1, 2001.

TECHNICAL FIELD

This invention relates to venting reclosable bags, and bag closures constructed to enable evacuation of air from closed bags.

BACKGROUND

Reclosable bags, such as those employing rib-and-groove type closures, have been known for decades and have become ubiquitous in food packaging. Such zipper-type closures are known to perform reasonably well for sealing bags between uses, and are readily extruded and weldable to various bag film materials.

For many applications, it is desirable prolonged exposure of the bag contents to air be avoided, such as to maintain freshness. Such applications include, for example, food storage bags and bags for marketing such food products as coffee, shredded cheese, fruit and lunchmeat, and also bags for storing fertilizers and seeds, sensitive electronic components, and materials that react with air. In such applications, most of the air within the bag may be expelled by collapsing the bag about its contents prior to closing the sealing closure.

SUMMARY

This invention features an improvement in bag and bag closure construction that can enable the evacuation of such bags with the closure closed, without undue complexity and cost.

According to one aspect of the invention, a vented bag includes a bag body having side walls defining a cavity therebetween for holding material therein and having an opening for accessing the cavity, and a reclosable closure secured to the side walls at the bag opening. The closure has extruded male and female interlocking profiles extending along opposing sides of the opening and constructed to releasably interlock along opposite sides of the male profile, and an extruded valve flange laterally spaced apart from the interlocking profiles and extending from one side of the closure to engage an opposing surface of the closure when the profiles are interlocked. The closure defines a vent passage extending from an air space between the opposing sides of the opening and between the interlocking profiles and the valve flange, and the flange and opposing surface are constructed to separate in response to pressure in the cavity for venting the bag with the profiles interlocked, and to increase a contact pressure therebetween in response to presence of a vacuum in the cavity.

In some embodiments the valve flange and one of the interlocking profiles are integrally extruded with a common base member to form one side of the closure. The female interlocking profile may be the one of the interlocking profiles integrally extruded with the common base member and the valve flange, for example, and in some cases the valve flange and opposing surface extend along a full extent of the bag opening.

In some constructions the valve flange and opposing surface are disposed inboard of the interlocking profiles, with the vent passage extending from the air space to atmosphere. In some other constructions the valve flange and opposing surface are disposed outboard of the interlocking profiles, with the vent passage extending from the air space to the cavity.

For some applications the valve flange is resiliently flexed by engagement with the opposing surface when the profiles interlock, to provide an initial contact pressure between the flange and opposing surface.

In a presently preferred embodiment, the valve flange extends as a cantilever from a flange base integrally extruded with one side of the closure, to a distal end having a contact surface configured to seal against said opposing surface, and the flange base is disposed generally inboard of the distal end of the flange, with the profiles interlocked.

In some embodiments the valve flange tapers in thickness, narrowing from its flange base to its distal end, and may be canted away from the cavity of the bag.

In some cases the opposing surface is concave and the contact surface of the valve flange is convex.

In some configurations the interlocking profiles form an airtight seal therebetween when interlocked. In some others, the vent passage is defined between the interlocking profiles, when interlocked.

The vent passage is defined, in some preferred constructions, through resin of one side of the closure. In some other cases the vent passage is defined between a back surface of one side of the closure and an adjacent bag wall material surface. In some cases the vent passage extends through resin of one side of the closure and through adjacent bag film forming one of the bag side walls.

The vented bag may be in the form of a disposable pouch, for example, and the bag opening may extend along an edge of the bag if desired.

In one illustrated embodiment, one of the extruded male and female interlocking profiles is segmented to define the vent passage between longitudinally spaced-apart portions thereof.

In some embodiments, the female interlocking profile has a first side portion, on a side adjacent the valve flange, arranged to engage one side of the male interlocking profile; and a second side portion, on a side opposite the valve flange, arranged to engage another side of the male interlocking profile, with the second side portion having a greater lateral thickness than the first side portion.

According to another aspect of the invention, a closure for bags includes first and second closure strips. The first closure strip has a first elongated base, a first extruded interlocking profile extending from the elongated base, and an extruded valve flange laterally spaced apart from the interlocking profile and extending from the elongated base. The second closure strip has a second elongated base, a second extruded interlocking profile extending from the second elongated base and configured to releasably interlock with the first extruded interlocking profile when pressed together, and a flange contact surface laterally spaced from the second extruded interlocking profile and configured to engage the valve flange of the first closure strip to form an air-tight seal therebetween when the profiles are interlocked, with the closure defining an air space between the interlocked profiles and the valve flange. The closure further defines an air vent passage extending into the air space with the profiles interlocked. The valve flange is constructed to separate from the contact surface in response to pressure on a first side of the valve flange, and to be biased against the contact surface in response to presence of a vacuum on said first side of the valve flange.

In some embodiments, the second extruded interlocking profile defines a groove therein for receiving the first extruded interlocking profile.

Preferably for some applications, the valve flange is constructed and arranged to resiliently flex during engagement with the contact surface when the profiles interlock, to provide an initial contact pressure between the flange and contact surface.

The valve flange may extend as a cantilever, for example, from a flange base integrally extruded with the first elongated base, to a distal end surface configured to seal against the flange contact surface. In some situations, the distal end surface is disposed generally nearer the profiles than is the flange base, with the profiles interlocked.

In some applications, the valve flange is canted toward the first interlocking profile, and the first side of the valve flange may be directed away from the first extruded interlocking profile.

According to another aspect of the invention, a method of filling and evacuating a bag is provided. The method includes providing a bag with a bag body having side walls defining a cavity therebetween for holding material therein and having an opening for accessing the cavity, and a reclosable closure as described herein, secured to the side walls at the bag opening; placing material into the cavity; sealing the bag; and then increasing air pressure within the cavity to expel air from the sealed bag through the vent passage of the closure.

In some cases, increasing air pressure includes compressing opposing sides of the sealed bag to separate the valve flange and contact surface of the closure and push air contained within the cavity out of the bag through the closure. The method also includes, in some cases, after expelling air from the sealed bag, releasing the opposing sides of the bag to re-engage the valve flange and contact surface of the closure and re-seal the bag.

The material may be placed into the cavity through the closure, between the interlocking profiles.

According to another aspect of the invention, a method of forming a reclosable bag is provided. The method includes providing a closure as described herein; attaching the first and second elongated bases to bag film; and forming a bag from the bag film, with the bag defining a cavity for containing contents and the first side of the valve flange directed toward the cavity.

The method also includes, in some instances, forming an air vent passage extending into the air space defined between the interlocked profiles and the valve flange. Forming the air passage may comprise piercing through one of the first and second elongated bases of the closure, for example.

In some other cases, the closure, as provided, defines an air vent passage extending into the air space defined between the interlocked profiles and the valve flange.

Among the potential advantages of several aspects of this invention is the enablement of simple and substantially complete evacuation of already closed storage bags by incorporating a one-way vent structure readily extrudable with many known interlocking profiles.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
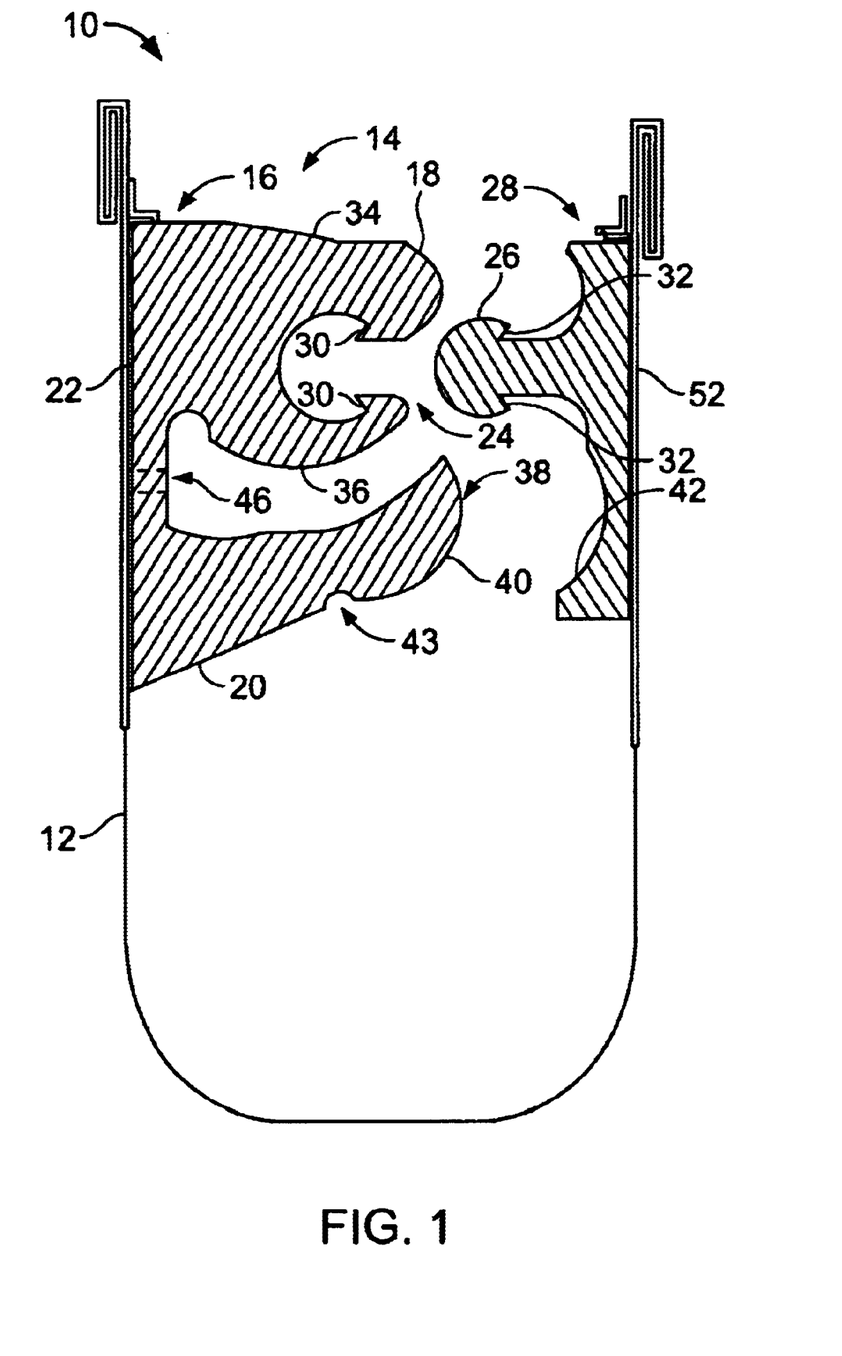
FIG. 1 illustrates a bag with a zipper-type closure of a first configuration, with the closure in an open state.

Referring first to FIG. 1, a bag 10 has a body 12 formed of a bag material, such as plastic film, and a resealable closure 14, shown enlarged for purposes of illustration. Closure 14 is shown in cross-section, and extends along the entire length of the bag opening for sealing the bag closed for storage. A first side 16 of closure 14 will be referred to as the female side for reference only and includes a female interlocking profile 18 and a valve flange 20, both integrally extruded with and extending from a common base 22. Female profile 18 defines a groove 24 for receiving a male interlocking profile 26 of the second side 28 of the closure, referred to herein as the male side, when the two sides of the closure are pressed together in a fashion generally known in the art of zipper-type closures for disposable bags. Female profile 18 defines two undercuts 30 for engaging corresponding overhangs 32 of the male profile 26 to keep the bag closed until the profiles are manually pulled apart. In this embodiment, the profiles are shown as being designed to provide a generally air-tight seal when interlocked, although such is not true in all cases. Second side 28 of the closure may be extruded of a harder resin, or otherwise formed to have a higher durometer than the first side 16 of the closure, for good valve performance and a readily engaged zipper seal with positive 'snap' tactile feedback.

Female profile 18 includes a relatively thick outboard arm 34 and a relatively thin inboard arm 36, which has a semi-circular notch 37 at its base to serve as a hinge point to enable arm 36 to flex or rotate as internal bag pressure forces the male side 28 of the closure away from the valve flange 20 and the female profile, helping to keep locking features 30 and 32 engaged as male profile 26 is pivoted and pulled away from the female profile. The relative thinness of arm 36 also enhances the extension of arm 36 relative to arm 34. As bag pressure decreases, the resilient deflection of inboard arm 36 will help to return the male portion of the closure to its original position and restore the seal between surfaces 40 and 42.

Figure 2:
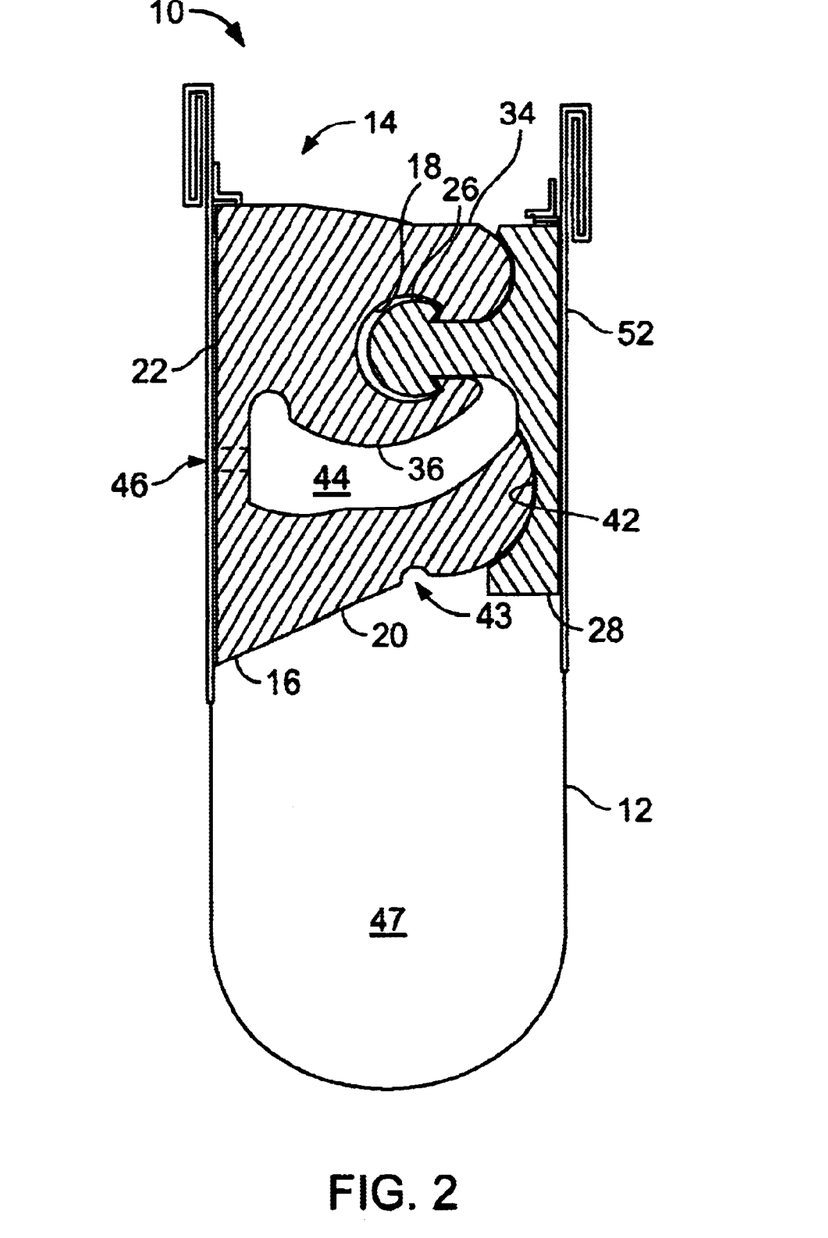
FIG. 2 shows the bag of FIG. 1, with the profiles of the closure interlocked.

Valve flange 20 tapers in thickness from its base to its distal end 38, where it has a longitudinally continuous, convex surface 40 shaped to normally engage and seal against a convex contact surface 42 of the male side 28 of the closure when the two profiles are interlocked as shown in FIG. 2. As shown, valve flange 20 is canted toward the interlocking profiles, and defines a notch 43 along its bagward side that serves as a hinge point to facilitate the movement of the upper portion of valve flange 20 away from sealing surface 42. Sufficient strain energy is retained in the valve flange, however, to force the valve flange back toward the sealing surface in the absence of elevated bag pressure.

Referring to FIG. 2, the engaged closure 14 defines an air space 44 between the interlocked profiles 18, 26 and the valve flange 20. An air vent passage 46 connects the air space 44 with the atmosphere outside the bag. Notably, valve flange 20 engages contact surface 42 with sufficient pressure to seal the cavity 49 defined within the bag body from intrusion of outside air entering space 44 through either vent passage 46 or the interlocked profiles. There will normally also be a nominal air space between the male and female profiles when engaged, although this air space does not play a role in the venting of the bag.

Figure 3:
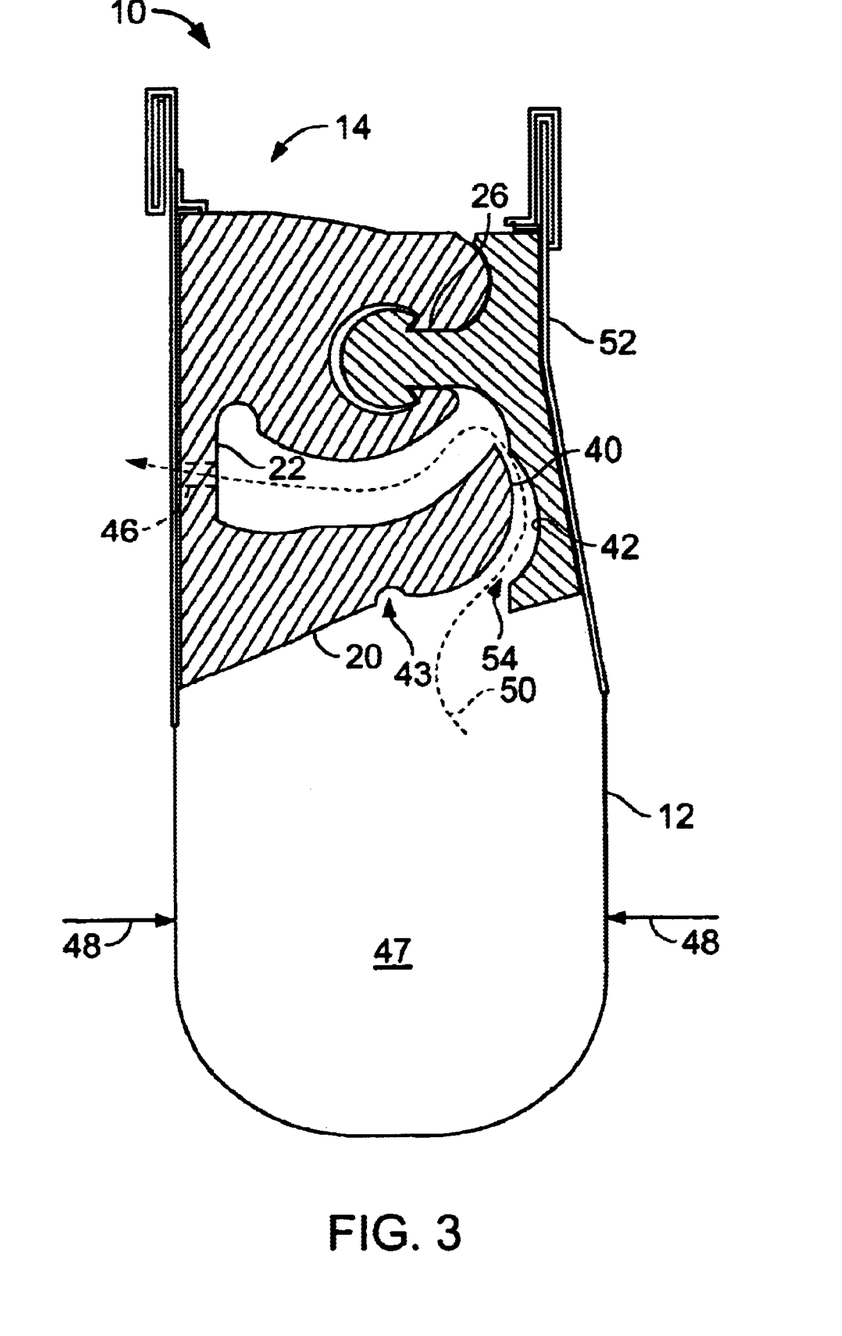
FIG. 3 shows the bag of FIG. 1 during pressurized venting.

Venting of trapped air through the interlocked closure 14 is illustrated in FIG. 3. When a sufficiently high pressure is obtained within the bag cavity 47, in comparison with the atmospheric pressure in closure air space 44, such as from compressing the side walls of the bag toward one another as illustrated by arrows 48, the distal end 40 of valve flange 20 separates from contact surface 42 and allows trapped air to flow between the valve flange and its contact surface and out to atmosphere through vent passage 46, as shown by dashed line 50. In this particular illustration, the base 52 of the male side of the closure is shown as being resiliently bent between the contact surface 42 and male profile 26, such as by separation force created by the increased pressure, to move contact surface 42 away from flange 20. The thickness of base 52 is less on the inboard side, with a generous radius adjacent male profile 26, to enhance this deflection. In other cases the valve flange itself is constructed to be deflected, bent about its base in cantilever fashion to move distal end surface 40 away from contact surface 42. In either case, a flow path 54 is temporarily created between the two contacting surfaces to allow the trapped air to escape under applied pressure. As soon as the pressure is released, the closure automatically returns to the state shown in FIG. 2, sealing the bag cavity against undesirable air intrusion. If sufficiently evacuated, a gage vacuum can be formed within the bag cavity 47 when the pressure is released. In such cases, the internal vacuum acts to further bias the valve flange surface 40 and the contact surface 42 toward each other to resist air intrusion and enhance the sealing effect of the closure.

The closure embodiment shown in FIGS. 1–3 can be employed to advantage in several applications in which protecting bag contents from air exposure is desired, such as in the storage of foodstuffs. The closure also provides a very user-friendly means of evacuating the air of a filled bag to reduce the overall size of the filled bag, which can be extremely important for conserving space during transportation and storage. In some in-home applications, disposable bags having such closures are useful for storing and freezing leftover foods, for example. Other applications include sandwich bags, bags for packaging of such retail products as coffee, rice, beans, nuts, dried fruits, shredded cheese and luncheon meats. Also, the closures are useful for storage of frozen vegetables and meats, breads, fertilizers, seeds, electronic components, and other items or materials that benefit from being stored under vacuum conditions.

Figure 4:
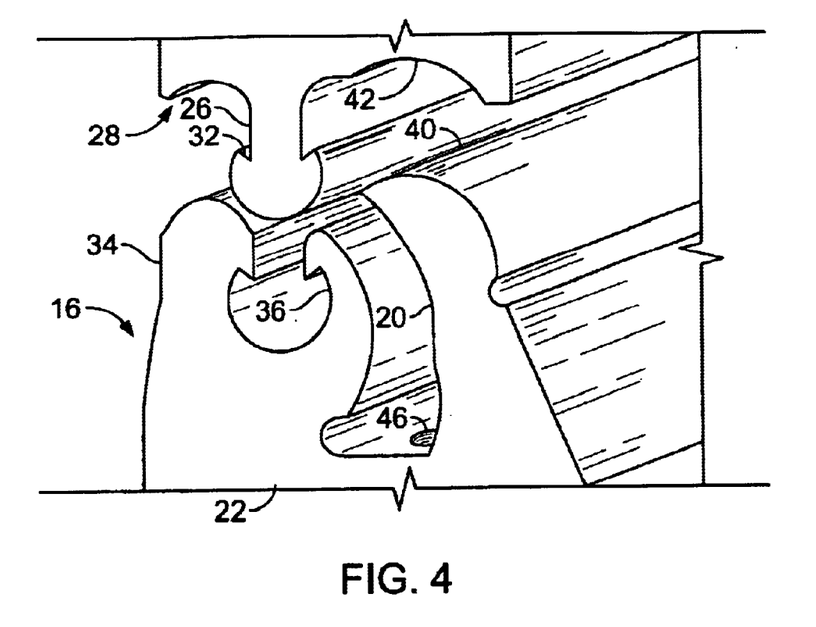
FIG. 4 is an enlarged perspective view of the closure of FIG. 1.
Figure 5:
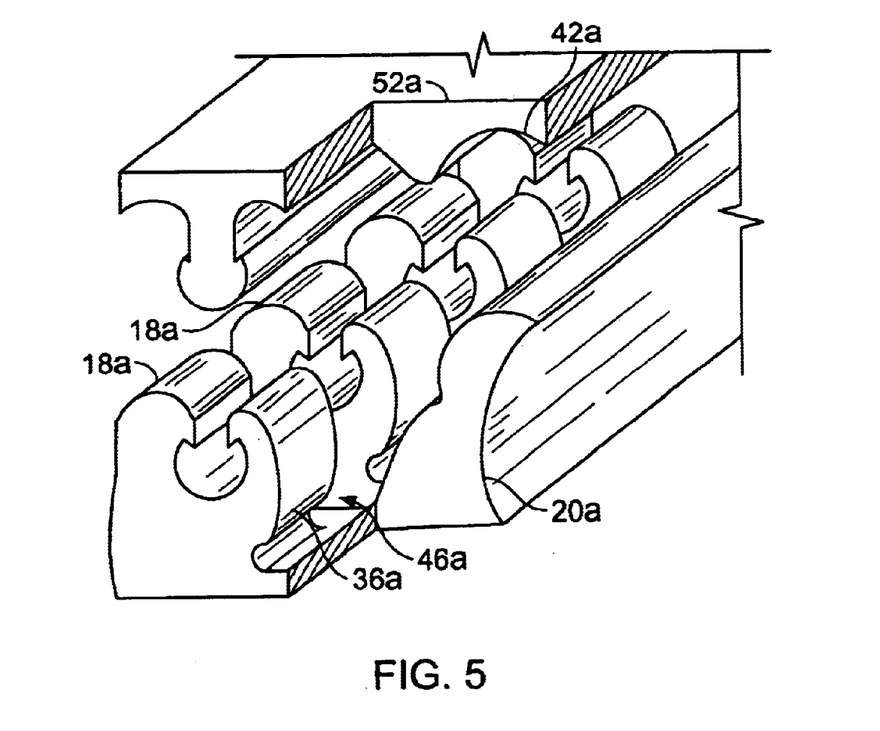
FIG. 5 is an enlarged perspective view of a second closure configuration.

FIGS. 4 and 5 are perspective views of two exemplary embodiments. FIG. 4 generally illustrates the closure 14 shown in FIGS. 1–3, in which air vent passages 46 are formed through the base 22 of the female side 18 of the closure, and the closure is constructed to be placed with valve flange 20 facing the bag interior. In the embodiment of FIG. 5, on the other hand, the valve flange 20a is canted away from the interlocking profiles, and the female interlocking profile 18a is segmented to form multiple air vent passages 46a through the interlocked profiles. Portions of both the valve flange 20a and the portion of the male side base 52a forming the contact surface 42a have been cutaway to show the segmented structure of the female profile. Segmented arms 36a independently deflect during engagement and flexure, and each segmented female profile section independently engages and disengages with the continuous male profile, providing a pleasant tactile or audible 'zip' feel or sound desired in some consumer applications. The configuration of FIG. 5 is intended to be positioned with the valve flange 20a on a side of the closure outboard of the interlocking profiles (i.e., away from the bag cavity). During venting, air under pressure from the bag interior acts freely on valve flange 20a to resiliently bend the valve flange out of contact with the opposing side of the closure, to allow interior air to flow through the segmented closure and around the distal end of the valve flange. When vent pressure is release, the valve flange 20a once again engages and seals against contact surface 42a, which engagement is automatically enhanced by any vacuum created in the bag interior.

The embodiment of FIG. 5 has the added advantage of not requiring the formation of vent passages extending to the outer surface of the bag, such as vent passages 46 of the embodiment of FIG. 4. However, forming the embodiment of FIG. 5 does require the segmenting of one or the other of the extruded interlocking profiles. Such procedures are known in the art and not detailed here. As an alternative to the forcible removal of whole sections of material from either profile, one of the two profiles may be transversely slit at several points along its length, and the slit closure strip plastically stretched to separate segments of the extruded profile rail. In either case, the valve flange and its mating contact surface remain longitudinally continuous so as to form the necessary seal in the final product.

Figure 6:
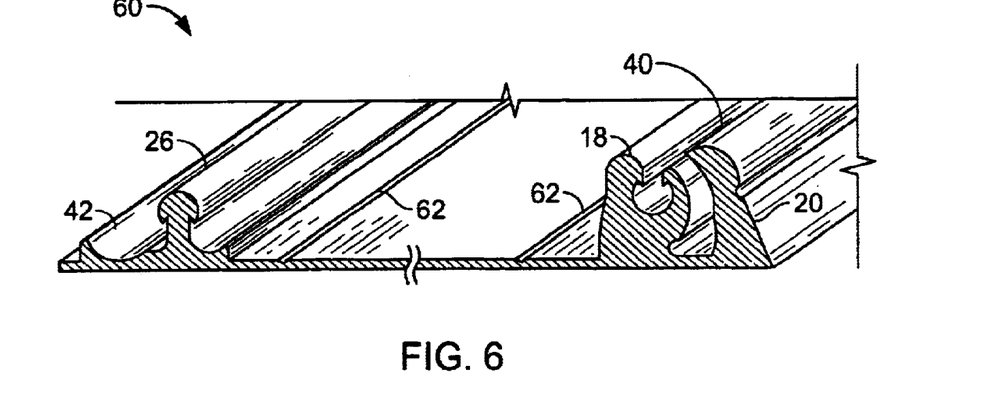
FIG. 6 shows a unitary closure strip extrusion.

As shown in FIG. 6, closure 60 may be provided as a unitary extrusion in which both mating profiles are formed on a single web. Such an extruded product can be readily integrated into standard bag-making equipment. The connecting web may be provided with tear grooves 62, ribs (not shown), or other extrudable features as desired for the intended application.

Figure 7:
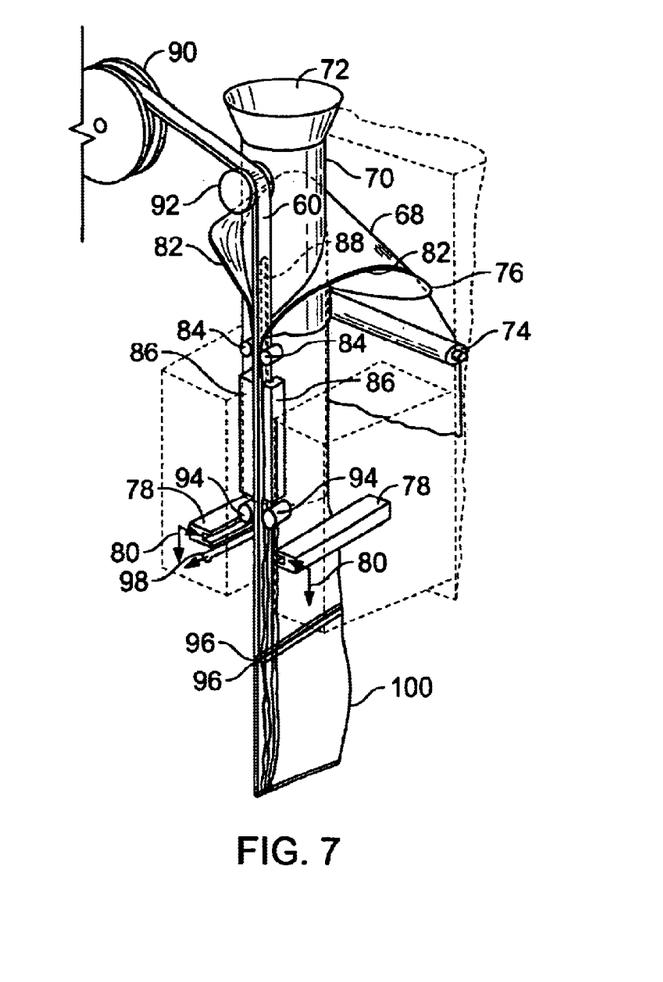
FIGS. 7 and 8 show one method of making and vertically filling bags while attaching the unitary closure strip.

For example, FIG. 7 illustrates a vertical form and fill (VFF) bag-making apparatus and method, for producing filled bags having closure strips extending along one edge of each bag, with the connecting web of the closure strip forming a tear strip in the final product for tamper evidence and shelf sealing. The bag-forming web consists of a thin sheet of thermoplastic film 68 which is shaped into a tube by being fed over a filling tube 70, which has an upper funnel end 72 through which contents are discharged to fall into individual bags formed of the film. Film 68 is fed from a roll (not shown) over an attitude roller 74, and guided onto the fill tube by curved guide forms 76. In some cases, the film is advanced continuously and the transverse sealing jaws 78 (described below) reciprocate vertically, traveling with the film during the sealing/cutting process (as indicated by arrows 80); in other cases the film is advanced incrementally and the transverse jaws remain within the same horizontal plane.

Figure 8:
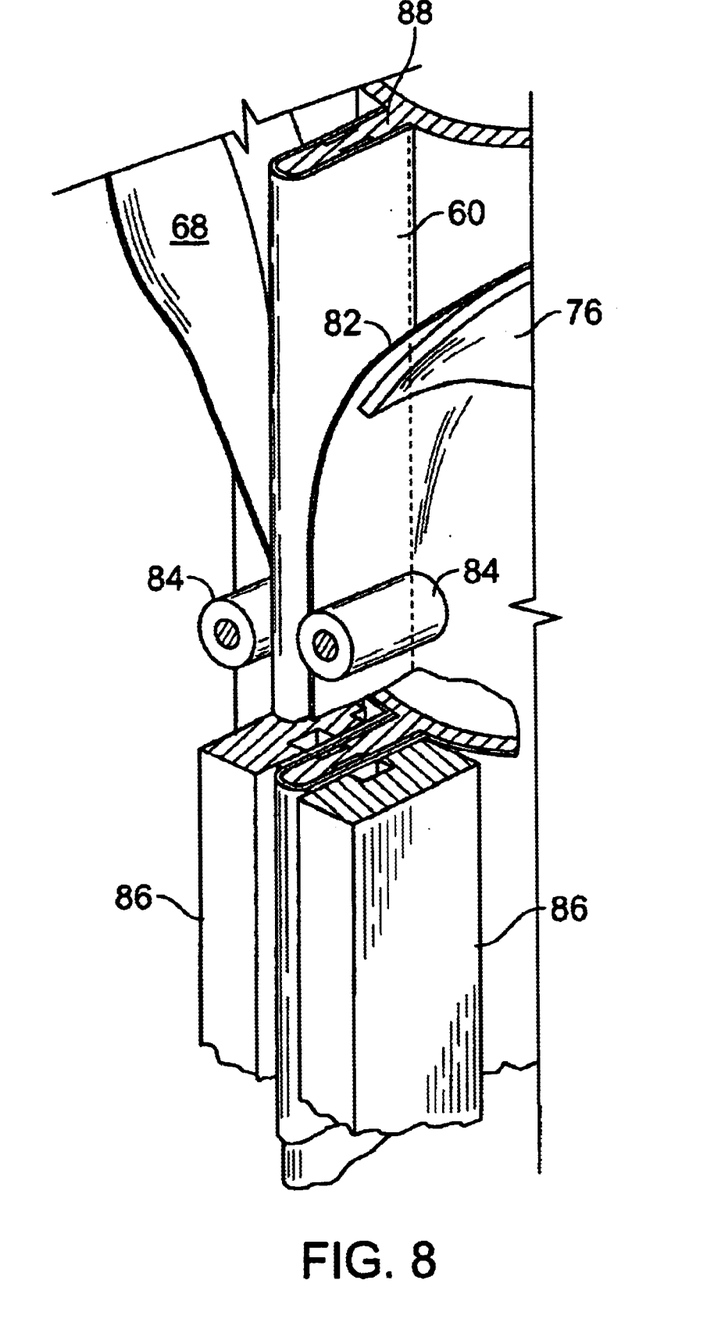

As film 68 is formed into a tube, its two longitudinal edges 82 form flanges extending generally radially from the tube, between which a continuous length of closure strip 60 is fed in a folded condition, such that the edge regions of the web film lie at least partially against the outer sides of the closure strip in face-to-face relation, but do not overlap the folded edge of the closure strip. Guide rollers 84 above the closure sealing bars 86 maintain the adjacency of the sides of the closure strip and the film edges. Closure strip 60 is fed over a contoured insulating rail 88 extending longitudinally along the fill tube from above guide rollers 84 to below closure sealing bars 86. As shown in FIG. 8, insulating rail 88 has a longitudinal groove along each of its sides to avoid crushing the interlocking profiles and sealing members of the closure, helping to guide the closure strip through the sealing process. The primary purpose of insulating rail 88 is to inhibit undesired welding of the inner sides of the closure strip together as the edges of the bag film are welded to the outer surfaces of the closure strip by closure sealing bars 86 (see FIG. 8).

Closure strip 60 may either be spooled from roll 90 over guide roll 92 in a folded condition, as shown, with its profiles interlocked and then pulled over insulating rail 88, thus separating the profiles of the closure strip, or the closure strip may be spooled flat and then folded about the insulating rail, thereby avoiding having to disengage the profiles in the process.

Closure sealing jaws 86 each have a longitudinal groove adjacent the longitudinal grooves of insulating rail 88, such that the heated sealing jaws slidingly contact the film edge regions only on either side of the thicker portions of the closure strip, sealing the film to the closure strip in two discrete bands on each side of the closure strip. Sealing jaws 86 have appropriate heating elements embedded within them (not shown) to maintain the sealing surfaces at a predetermined, elevated temperature. Immediately below the lower edges of sealing jaws 86, insulating rail 88 terminates and the profiles of the closure strip are pressed together between a pair of rollers 94, just above the lower end of fill tube 70.

After a selected amount of contents have discharged through the lower end of the fill tube, transverse sealing jaws 78 come together about the bag film and closure strip and form two parallel, transverse seals 96, each of which will form the sealed edge of a bag. As jaws 78 travel with the advancing film, a cutting knife 98 within the jaws severs the film and closure strip between the transverse seals 96. When jaws 78 open at the end of the sealing cycle, a fully formed, filled and severed bag 100 is complete.

Figure 9:
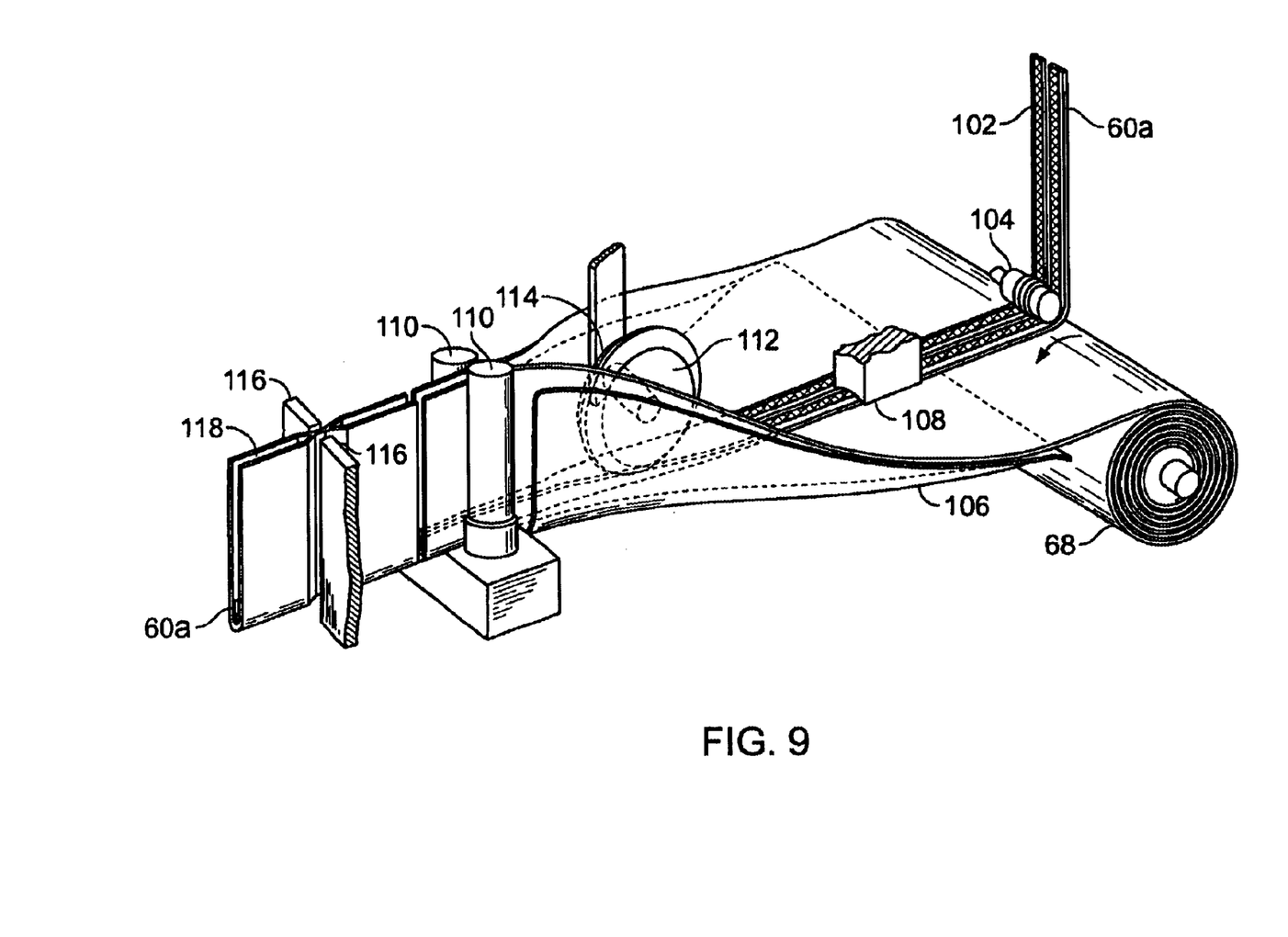
FIG. 9 shows a method of making a series of empty, linked bags incorporating the unitary closure strip.

FIG. 9 shows another application of my closure strip in a bag-making process. Closure strip 60a is differs from the closure strip shown in FIG. 6 only in that in contains a pull cord 102 embedded along a central rib of the closure, extending generally midway between the interlocking profiles. The pull cord is configured to tear through the closure strip and bag film longitudinally between the interlocking profiles when pulled transverse to the closure strip, and therefore must be of sufficient tensile strength to tear through the closure strip resin without breaking. Suitable pull cord materials include drawn nylons, such as fishing line, for example. The pull cord may be embedded within the resin of the center closure strip rib at the time of extrusion, for example.

Closure strip 60a is passed around a guide roller 104 to travel with bag film 68 onto a folding collar 106 where it is permanently bonded to the film under heat and pressure by a sealing shoe 108 that slidingly engages the closure strip along three bands, forming continuous welds between the closure strip and bag film 68. Collar 106 supports the bag film against the light pressure applied by the sealing shoe. Channels in the sealing shoe accommodate the profiles and center rib of the closure strip, accordingly, and maintain the transverse location of the closure strip during bonding.

Once welded together, bag film 68 and closure strip 60a are folded along their longitudinal centerline and passed between two drive rollers 110 that press the profiles of the closure strip together and ensure an appropriate crease along the spine of the closure strip. The folding of the bag film and closure strip is effected by collar 106 and a creasing idler 112 that runs along the center of the closure strip and defines a rim groove 114 for receiving the center rib of the closure strip during folding.

The folded bag film next passes between a pair of reciprocating sealing/cutting jaws 116 which close against the outer surfaces of the bag film to seal the two sides of the folded bag film and the folded closure strip together to form a series of individual pouches, each pouch sealed on three sides and having a single open end 118 for subsequent filling. Jaws 116 may be configured to also sever the pouches from each other during sealing, or to leave the pouches connected in the form of a string of pouches that is readily pulled through an adjacent filling/closing station (not shown).

Of course, the closure strip configurations discussed above can be incorporated into a wide range of bag-making operations and applications known in the art. The ones described above are for illustration only.

A number of embodiments of the invention have been described. Nevertheless, it will be understood that various modifications may be made without departing from the spirit and scope of the invention. Accordingly, other embodiments are within the scope of the following claims.

What is claimed is:

1. A vented bag comprising
 a bag body having side walls defining a cavity therebetween for holding material therein and having an opening for accessing the cavity; and
 a reclosable closure secured to the side walls at the bag opening, the closure comprising
  extruded male and female interlocking profiles extending along opposing sides of the opening and constructed to releasably interlock along opposite sides of the male profile; and
  an extruded valve flange laterally spaced apart from the interlocking profiles and extending from one side of the closure to engage an opposing surface of the closure when the profiles are interlocked;
 the closure defining a vent passage extending from an air space between the opposing sides of the opening and between the interlocking profiles and the valve flange;
 the flange and opposing surface constructed to separate in response to pressure in said cavity for venting the bag with the profiles interlocked, and to increase a contact pressure therebetween in response to presence of a vacuum in said cavity.

2. The vented bag of claim 1 wherein the valve flange and one of the interlocking profiles are integrally extruded with a common base member to form one side of the closure.

3. The vented bag of claim 2 wherein the female interlocking profile is the one of the interlocking profiles integrally extruded with the common base member and the valve flange.

4. The vented bag of claim 2 wherein the valve flange and opposing surface extend along a full extent of the bag opening.

5. The vented bag of claim 1 wherein the valve flange and opposing surface are disposed inboard of the interlocking profiles, with the vent passage extending from said air space to atmosphere.

6. The vented bag of claim 1 wherein the valve flange and opposing surface are disposed outboard of the interlocking profiles, with the vent passage extending from said air space to said cavity.

7. The vented bag of claim 1 wherein the valve flange is resiliently flexed by engagement with the opposing surface when the profiles interlock, to provide an initial contact pressure between the flange and opposing surface.

8. The vented bag of claim 1 wherein the valve flange extends as a cantilever from a flange base integrally extruded with one side of the closure, to a distal end having a contact surface configured to seal against said opposing surface.

9. The vented bag of claim 8 wherein the flange base is disposed generally inboard of the distal end of the flange, with the profiles interlocked.

10. The vented bag of claim 1 wherein the valve flange tapers in thickness, narrowing from its flange base to its distal end.

11. The vented bag of claim 1 wherein the opposing surface is concave and the contact surface of the valve flange is convex.

12. The vented bag of claim 1 wherein the valve flange is canted away from the cavity of the bag.

13. The vented bag of claim 1 wherein the interlocking profiles form an airtight seal therebetween when interlocked.

14. The vented bag of claim 1 wherein the vent passage is defined between the interlocking profiles, when interlocked.

15. The vented bag of claim 1 wherein the vent passage is defined through resin of one side of the closure.

16. The vented bag of claim 1 wherein the vent passage is defined between a back surface of one side of the closure and an adjacent bag wall material surface.

17. The vented bag of claim 1 wherein the vent passage extends through resin of one side of the closure and through adjacent bag film forming one of the bag side walls.

18. The vented bag of claim 1 comprising a disposable pouch.

19. The vented bag of claim 1 wherein the bag opening extends along an edge of the bag.

20. The vented bag of claim 1 wherein one of the extruded male and female interlocking profiles is segmented to define the vent passage between longitudinally spaced-apart portions thereof.

21. The vented bag of claim 1 wherein the female interlocking profile comprises
- a first side portion, on a side adjacent the valve flange, arranged to engage one side of the male interlocking profile; and
- a second side portion, on a side opposite the valve flange, arranged to engage another side of the male interlocking profile; the second side portion having a greater lateral thickness than the first side portion.

22. A closure for bags, the closure comprising
- a first closure strip comprising a first elongated base, a first extruded interlocking profile extending from the elongated base, and an extruded valve flange laterally spaced apart from the interlocking profile and extending from the elongated base; and
- a second closure strip comprising a second elongated base, a second extruded interlocking profile extending from the second elongated base and configured to releasably interlock with the first extruded interlocking profile when pressed together, and a flange contact surface laterally spaced from the second extruded interlocking profile and configured to engage the valve flange of the first closure strip to form an air-tight seal therebetween when the profiles are interlocked, with the closure defining an air space between the interlocked profiles and the valve flange;
- the closure further defining an air vent passage extending into the air space with the profiles interlocked;
- wherein the valve flange is constructed to separate from the contact surface in response to pressure on a first side of the valve flange, and to be biased against the contact surface in response to presence of a vacuum on said first side of the valve flange.

23. The closure of claim 22 wherein the second extruded interlocking profile defines a groove therein for receiving the first extruded interlocking profile.

24. The closure of claim 22 wherein the valve flange is constructed and arranged to resiliently flex during engagement with the contact surface when the profiles interlock, to provide an initial contact pressure between the flange and contact surface.

25. The closure of claim 22 wherein the valve flange extends as a cantilever from a flange base integrally extruded with the first elongated base, to a distal end surface configured to seal against said flange contact surface.

26. The closure of claim 25 wherein the distal end surface is disposed generally nearer the profiles than is the flange base, with the profiles interlocked.

27. The closure of claim 22 wherein the valve flange tapers in thickness, narrowing from its flange base to its distal end surface.

28. The closure of claim 22 wherein the valve contact surface is concave and the distal end surface of the valve flange is convex.

29. The closure of claim 22 wherein the valve flange is canted toward the first interlocking profile.

30. The closure of claim 22 wherein the interlocking profiles are configured to form an airtight seal therebetween when interlocked.

31. The closure of claim 22 wherein the vent passage is defined between the interlocking profiles, when interlocked.

32. The closure of claim 22 wherein one of the extruded male and female interlocking profiles is segmented to define the vent passage between longitudinally spaced-apart portions thereof.

33. The closure of claim 22 wherein one of the first and second interlocking profiles comprises
- a first side portion, on a side adjacent the valve flange with the profiles interlocked, arranged to engage one side of the other of the first and second interlocking profiles; and
- a second side portion, on a side opposite the valve flange with the profiles interlocked, arranged to engage another side of the other of the first and second interlocking profiles; the second side portion having a greater lateral thickness than the first side portion.

34. The closure of claim 22 wherein said first side of the valve flange is directed away from the first extruded interlocking profile.

* * * * *